United States Patent
Preciado

(10) Patent No.: US 12,081,063 B2
(45) Date of Patent: Sep. 3, 2024

(54) DEVICE ENERGY USE DETERMINATION

(71) Applicant: PassiveLogic, Inc., Salt Lake City, UT (US)

(72) Inventor: Marciano Preciado, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 0 days.

(21) Appl. No.: 17/373,230

(22) Filed: Jul. 12, 2021

(65) Prior Publication Data

US 2023/0010757 A1  Jan. 12, 2023

(51) Int. Cl.
*G05B 19/042* (2006.01)
*H02J 7/35* (2006.01)
*H02J 13/00* (2006.01)

(52) U.S. Cl.
CPC .............. *H02J 7/35* (2013.01); *G05B 19/042* (2013.01); *H02J 13/00002* (2020.01); *G05B 2219/2639* (2013.01)

(58) Field of Classification Search
None
See application file for complete search history.

(56) References Cited

U.S. PATENT DOCUMENTS

| 1,159,886 A | 11/1915 | Becker |
| 4,651,158 A | 3/1987 | Nelson |
| 5,634,149 A | 5/1997 | Jeong et al. |
| 5,787,133 A | 7/1998 | Marchetto et al. |
| 5,835,458 A | 11/1998 | Bischel et al. |
| 6,537,128 B1 | 3/2003 | Hampton et al. |
| 6,571,343 B1 | 5/2003 | Johnson et al. |
| 6,638,752 B2 | 10/2003 | Contag et al. |
| 6,686,731 B2 | 2/2004 | Tacconi |
| 6,953,924 B2 | 10/2005 | Boubal et al. |
| 7,418,620 B1 | 8/2008 | Tormasov et al. |
| 7,791,664 B1 | 9/2010 | Koifman |
| 7,944,652 B2 | 5/2011 | Fukumoto |
| 8,349,602 B1 | 1/2013 | Contag et al. |

(Continued)

FOREIGN PATENT DOCUMENTS

| CN | 110139235 A | * 8/2019 |
| JP | 2007026487 A | 2/2007 |

(Continued)

OTHER PUBLICATIONS

Dai, Wenbin, et al. "Toward self-manageable and adaptive industrial cyber-physical systems with knowledge-driven autonomic service management." IEEE Transactions on Industrial Informatics 13.2 (2016)L pp. 725-736. (Year: 2016).

(Continued)

*Primary Examiner* — Jason Lin

(57) ABSTRACT

A device that runs on solar and battery power determines a current cycle energy budget by looking at a previous cycle or cycles energy accumulation and previous cycle or cycles unexpected expenses. The energy budget will then be the energy accumulation minus the unexpected expenses, normalized for cycle length. Based on the energy budget, an operating mode is chosen. The operating mode determines how often certain actions are taken. The device then runs for a cycle length based of the operating mode.

17 Claims, 6 Drawing Sheets

(56) References Cited

U.S. PATENT DOCUMENTS

| | | | | |
|---|---|---|---|---|
| 8,604,746 B2* | 12/2013 | Lee | | H02J 3/381 |
| | | | | 320/101 |
| 8,729,471 B2 | 5/2014 | Barbi et al. | | |
| 8,848,757 B2 | 9/2014 | Joseph | | |
| 9,037,307 B2* | 5/2015 | Kaji | | H02J 3/003 |
| | | | | 700/291 |
| 9,040,914 B2 | 5/2015 | Knapp | | |
| 9,049,582 B1 | 6/2015 | Hassan | | |
| 9,106,854 B2 | 8/2015 | Adkisson et al. | | |
| 9,280,748 B2 | 3/2016 | Nugent | | |
| 9,332,738 B2 | 5/2016 | Hebrank et al. | | |
| 9,456,776 B2 | 10/2016 | Ando | | |
| 9,589,238 B2 | 3/2017 | Nugent | | |
| 9,656,621 B2 | 5/2017 | Curtis et al. | | |
| 9,843,229 B2* | 12/2017 | Leabman | | H02J 50/20 |
| 9,847,669 B2* | 12/2017 | Leabman | | H02J 50/20 |
| 9,953,260 B1 | 4/2018 | Nugent | | |
| 10,135,295 B2* | 11/2018 | Leabman | | H02J 50/20 |
| 10,199,849 B1* | 2/2019 | Bell | | H04W 4/80 |
| 10,333,305 B2* | 6/2019 | Imai | | G06Q 50/06 |
| 10,386,544 B2* | 8/2019 | Yuan | | G06N 7/01 |
| 10,440,546 B2 | 10/2019 | Polo et al. | | |
| 10,585,304 B2 | 3/2020 | Ding et al. | | |
| 10,650,336 B2* | 5/2020 | Kopp | | F24F 11/64 |
| 10,775,824 B2* | 9/2020 | Main | | H02J 3/14 |
| 11,009,933 B2 | 5/2021 | Heo et al. | | |
| 11,209,813 B2 | 12/2021 | Cella et al. | | |
| 11,231,705 B2 | 1/2022 | Cella et al. | | |
| 11,237,556 B2 | 2/2022 | Nugent | | |
| 11,598,862 B2 | 3/2023 | Henderson et al. | | |
| 11,726,184 B2 | 8/2023 | Ferreira et al. | | |
| 2003/0038621 A1 | 2/2003 | Tacconi | | |
| 2006/0056363 A1* | 3/2006 | Ratiu | | G01D 21/00 |
| | | | | 370/254 |
| 2006/0103545 A1 | 5/2006 | Tsou | | |
| 2007/0112273 A1 | 5/2007 | Rogers | | |
| 2008/0296979 A1* | 12/2008 | Kato | | H02J 50/10 |
| | | | | 307/104 |
| 2009/0135753 A1 | 5/2009 | Veillette | | |
| 2009/0167195 A1 | 7/2009 | Katsu | | |
| 2009/0217063 A1 | 8/2009 | Tomita | | |
| 2010/0134285 A1 | 6/2010 | Holmquist | | |
| 2010/0269383 A1* | 10/2010 | Nifenecker | | H05B 45/325 |
| | | | | 40/541 |
| 2013/0232361 A1 | 9/2013 | Nishii | | |
| 2014/0143566 A1 | 5/2014 | Asano | | |
| 2014/0304542 A1 | 10/2014 | Rogers et al. | | |
| 2015/0121684 A1 | 5/2015 | Kuutti et al. | | |
| 2015/0185819 A1 | 7/2015 | Saito | | |
| 2016/0020854 A1 | 1/2016 | Engel | | |
| 2016/0086191 A1 | 3/2016 | Fonzi et al. | | |
| 2016/0124495 A1 | 5/2016 | Kim et al. | | |
| 2016/0154038 A1* | 6/2016 | Toizumi | | G01R 21/00 |
| | | | | 702/61 |
| 2016/0209063 A1* | 7/2016 | Fang | | F24F 11/30 |
| 2016/0248251 A1* | 8/2016 | Tinnakornsrisuphap | | |
| | | | | H02J 13/00 |
| 2017/0217390 A1 | 8/2017 | Curtis et al. | | |
| 2017/0299210 A1 | 10/2017 | Nyamjav et al. | | |
| 2017/0342920 A1* | 11/2017 | Pirjaberi | | F02D 41/0002 |
| 2018/0132340 A1 | 5/2018 | Correa et al. | | |
| 2018/0224819 A1 | 8/2018 | Noboa | | |
| 2018/0375720 A1 | 12/2018 | Yang et al. | | |
| 2019/0020197 A1* | 1/2019 | Ahn | | H02J 3/004 |
| 2019/0074990 A1 | 3/2019 | Reimer | | |
| 2019/0190308 A1 | 6/2019 | Miyoshi et al. | | |
| 2019/0220077 A1* | 7/2019 | Tuan | | G06F 1/3212 |
| 2019/0258251 A1 | 8/2019 | Pitty et al. | | |
| 2019/0357096 A1* | 11/2019 | Warashina | | H04W 36/08 |
| 2020/0284883 A1 | 9/2020 | Ferreira et al. | | |
| 2020/0326563 A1 | 10/2020 | Suess et al. | | |
| 2021/0298363 A1 | 9/2021 | Daugherty et al. | | |
| 2021/0325244 A1 | 10/2021 | Nishino | | |
| 2022/0095084 A1 | 3/2022 | Evans et al. | | |
| 2023/0007724 A1 | 1/2023 | Li | | |

FOREIGN PATENT DOCUMENTS

| | | | | |
|---|---|---|---|---|
| JP | 2017188905 | A | | 10/2017 |
| JP | 2018033257 | A | * | 3/2018 |
| JP | 2018097874 | A | | 6/2018 |
| KR | 20200092074 | A | * | 8/2020 |
| WO | 9740381 | A1 | | 10/1997 |
| WO | 2005050156 | A2 | | 6/2005 |
| WO | 2014145030 | A2 | | 9/2014 |

OTHER PUBLICATIONS

González-Briones, Alfonso, et al. "Energy optimization using a case-based reasoning strategy." Sensor 18.3 (2018): pp. 1-27. (Year: 2018).

Jayakumar, Geetha, and Ganapathy Gopinath. "Ad hoc mobile wireless networks routing protocols—a review." Journal of Computer Science 3.8 (2007): pp. 574-582. (Year: 2007).

Grady, Steve, "Zero Power Wireless Sensors Using Energy Processing," "https://www.mouser.com/storing_harvested_energy/", last viewed Oct. 12, 2021.

IoT Devices (Battery operation, Low power consumption), Torex Semiconductor Ltd, 2015, https://www.torexsemi.com/file/en/by-application/industrial_iot-device.pdf viewed on Oct. 12, 2021.

Clement, Dan, "Onsemi low power event triggering imaging," Feb. 8, 2021 "https://www.onsemi.com/company/news-media/blog/iot/what-is-ultra-low-power-event-triggered-imaging" Last viewed Oct. 12, 2021.

La Rosa et al., Strategies and Techniques for Powering Wireless Sensor Nodes through Energy Harvesting and Wireless Power Transfer, Sensors (Basel). Jun. 2019; 19(12): 2660.

Mouser Electronics News Release, Aug. 16, 2018.

Paul Pickering, "Designing Ultra-Low-Power Sensor Nodes for IoT Applications", ElectronicDesign.com, Oct. 6, 2016 https://www.electronicdesign.com/power-management/article/21802213/designing-ultralowpower-sensor-nodes-for-iot-applications, last viewed Oct. 12, 2021.

Pikkerton 2021"https://www.pikkerton.com/Technologies/UltraLowPowerSensors/UltraLowPowerSensors.htm" Last visited Oct. 12, 2021.

Squires, et al., "Energy Harvesting for Low-Power Sensor Systems," Renesas Electronics America Inc. Feb. 2015, https://www.renesas.com/us/en/document/whp/energy-harvesting-low-power-sensor-systems?language=en, last viewed Oct. 12, 2021.

Chowdhury, M. E. H., et al., "A Low-Cost Closed-loop Solar Tracking System Based o the Sun Position Algorithm", Journal of Sensors, vol. 2019, Article ID 3681031, 11 pp.

Kreider, D., and Lahr, D., "Trapezoidal Rule and Simpson's Rule", 2002, 2008, 2010.

Written Opinion of the International Searching Authority for PCT/US22/36676, Dec. 5. 2022.

International Search Report for International application No. PCT/US22/36676, Dec. 5, 2022.

International Search Report for PCT/US22/42915, Feb. 23, 2023.

\* cited by examiner

800

```
Device 805
  ┌─────────────────────────────┐  ┌─────────────────────────────┐
  │ Energy Harvesting Portion 810│  │ Energy Storage Element 815 │
  └─────────────────────────────┘  └─────────────────────────────┘
  ┌─────────────────────────────┐  ┌─────────────────────────────┐
  │ Transmitter Portion 820     │  │ Sensor Portion 825          │
  └─────────────────────────────┘  └─────────────────────────────┘
  Processor and Memory Element 830
  ┌─────────────────────────────┐  ┌─────────────────────────────┐
  │ Computer Program 835        │  │ Catalogued Expenses 840     │
  └─────────────────────────────┘  └─────────────────────────────┘
```

Program 905

- Determine Cycle Length 910
- Determine Power Gathered Previously 915
- Determine Unexpected Power Consumption Previously 920
- Determine Battery Power 925
- Determine Energy Budget 930
- Normalize for Cycle Length 935
- Use Energy Budget to Determine Operating Mode 940
- Use Operating Mode to Determine Sensor Sampling Rates 945

FIG. 9

DEVICE ENERGY USE DETERMINATION

FIELD OF INVENTION

The present disclosure relates to sensors; more specifically, sensors that manage energy efficiently.

BACKGROUND

Sensors are widely used and widely useful. However, sensor energy consumption can be significant, especially in wireless sensor networks, which both have a limited power supply and large energy uses.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, some technologies described herein describe an energy efficient sensor.

In embodiments, a device is disclosed, comprising: a solar panel; a battery; a first communication medium; a processor with memory, and device data; wherein the device is operationally able to use the processor with memory to: identify solar power energy. In some embodiments, estimate solar power energy accumulation is estimated from periodic power income measurements. In some embodiments the device identifies unexpected operation energy consumption from the last cycle. In some embodiments, unexpected consumption comes from user interaction. Possible user interaction may be measured and such consumption may be cataloged in memory. In some embodiments, the device creates an energy budget using the solar power energy accumulation from a last cycle and the unexpected operation energy consumption from the last cycle; determine an operating mode based on the energy budget; based on the operating mode, determine current operating parameters; and run the device for a current cycle length using the current operating parameters.

In embodiments, the device further comprises: an index, a first cycle length and a longest cycle length, wherein a second cycle length is equal to the first cycle length, wherein the index is incremented for each cycle, and wherein third and subsequent cycle lengths are equal to the first cycle length*(index-2)*2 until a subsequent cycle length>=the longest cycle length, in which case longest cycle length is chosen In embodiments, the device is operationally able to use the processor with memory to use the first communication medium to receive a message from a neighboring node.

In embodiments, the device is operationally able to use the processor with memory to create the energy budget by taking a power reading from the solar panel and determining solar power energy accumulation of the last cycle equals the sensor reading extended for a current cycle length. In some embodiments, the device is operationally able to initiate a connection with another device to report collected sensor measurements as they are taken. The device may be a phone, a master computer, a satellite computer, a controller, and so on.

In embodiments, the device is operationally able to use the processor with memory to choose a communication range of the first communication medium based on the operating mode.

In embodiments, the device further comprises a second communication medium and wherein the device is operationally able to use the processor with memory to choose to communicate using the first communication medium or the second communication medium based on the operating mode. These communication mediums may be a wired communication medium such as ethernet, a wireless communication medium, a wireless transmitter, a 1-wire communication line, or a dedicated transmission line.

In embodiments, the device further comprising an expense budget, and wherein the expense budget comprises solar power energy accumulation from the last cycle minus unexpected operation energy consumption from the last cycle normalized for current cycle length.

In embodiments, the device further comprising a sensor, and wherein the sensor comprises a temperature sensor, a radiant temperature sensor, a humidity sensor, a $CO_2$ sensor, a volatile organic compound sensor, an atmospheric pressure sensor, a light level sensor, an occupant mapping sensor, an occupancy detection sensor, or an occupancy velocity sensor.

In embodiments, the solar panel energy accumulation for the last cycle comprises measuring a raw power income of the solar panel during intervals in the last cycle to produce a measured raw power.

In embodiments, the measured raw power is estimated using a trapezoidal rule.

In embodiments, a device with energy management is disclosed, the device comprising: an energy harvesting portion configured to harvest energy from light external to the device; an energy storage element associated with the energy harvesting portion; a sensor portion; a transmitter configured to send information from the device to an entity; a processing and memory element comprising a computer program, the computer program operationally able to determine amount of energy gathered by the energy harvesting portion during a first cycle time; the computer program operationally able to use the amount of energy gathered by the energy harvesting portion during the first cycle time to determine an energy budget for a second cycle time; the computer program operationally able to use the energy budget for the second cycle time to determine an operating mode for the second cycle time, wherein the operating mode comprises sensor reporting interval, data reporting rate or transmitter range; and the computer program operationally able to use the operating mode to run for the second cycle time.

In embodiments, the device further comprising the computer program operationally able to determine amount of energy stored by the energy storage element during a first time and further comprising using the amount of energy stored to determine the energy budget for a second time.

In embodiments, the device further comprising the computer program operationally able to determine an unexpected power consumption amount for a first cycle, and wherein the computer program is operationally able to subtract the unexpected power consumption amount for the first cycle from the amount of energy gathered by the energy harvesting portion during the first cycle to determine the energy budget for the second cycle time.

In embodiments, the computer program is configured to determine subsequent cycle times such that when cycle number=0, and cycle number=1, cycle time=a shortest cycle time, otherwise cycle time=shortest cycle time*(cycle number-1)*2 until cycle time=a longest cycle time. "If previous duration n greater than or equal to the longest one than duration is double."

In embodiments, the shortest cycle time is less than 60 minutes, and wherein the longest cycle time is >=23 hours.

In embodiments, the device further comprising a high power sensor portion and a low power sensor portion, and wherein the high power sensor portion and the low power sensor portion have separate sensor sampling rates based on the operating mode for the second cycle time.

In embodiments, a device solar energy battery management method implemented by one or more computers with memory and one or more processors is disclosed, comprising: detecting an unexpected energy consumption used by a device during a first time, detecting an amount of solar energy stored by the device during the first time; determining an operating budget using the amount of solar energy stored by the device and the unexpected energy consumption; setting an operating mode using the operating budget; and running the device using the operating mode. Unexpected energy consumption may comprise an unexpected action by a user or a controlling device. In embodiments, setting the operating mode further comprises determining a device action value based on the operating mode. The operating mode determines frequency of operation (power measure, environmental sensing, reporting to reporting device, to attempt to maintain a net-zero energy consumption, etc.)

In embodiments, setting the operating mode further comprises setting a schedule for the device.

In embodiments, a device action value comprises a a solar power energy polling interval, a battery level polling interval, a device reboot interval, a sensor listening interval, a report interval, a wireless connection interval, a wireless connection mesh interval, or a solar power relay count. These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

FIG. 8 is a functional block diagram showing an exemplary embodiment of some features of a sensor in conjunction with which some described embodiments can be implemented.

FIG. 9 describes methods that can be used by a processor and memory element in conjunction with which some described embodiments can be implemented.

Figure 1:
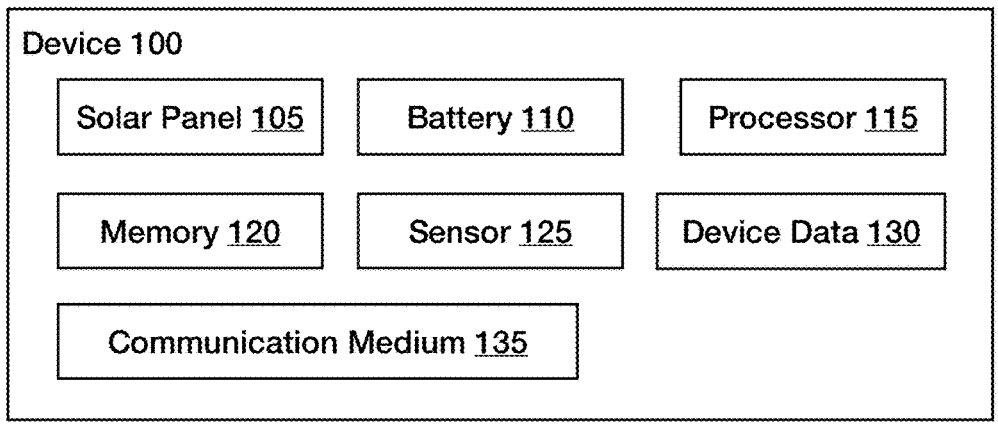
FIG. 1 is a functional block diagram showing an exemplary embodiment of some features of a sensor in conjunction with which some described embodiments can be implemented.

(35) Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to systems and methods for automatically creating wiring diagrams. Described embodiments implement one or more of the described technologies.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may be referred to as a "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as providing sensors which use power flexibly depending on energy available in the environment without requiring recoding. This requires much less work to implement, and gives sensors that require battery changes much less frequently than similar items. Other advantages based on the technical characteristics of the teachings will also be apparent to one of skill from the description provided.

I. Overview

Low-energy devices, such as sensors, may be used in buildings that are energy efficient. These energy efficient devices may be solar powered, and/or may be able to recharge an on-board battery using ambient light. These devices may determine how much energy was used in a last cycle, and then use that energy determination to determine how much energy is available for a next cycle.

The device may be wired to a controller, which may be a satellite controller, or the like, or may have a wireless connection. The wireless connection may be to a controller, a satellite controller, another device, a web of devices, or the like. The device may report to any sort of device that accepts such a report, such as a sensor, a cell phone, an in-home controller, a satellite controller, a controller, etc. The device may have a rechargeable battery. The battery may recharge automatically using ambient light. The battery may have a year of backup battery charge when the battery is fully charged, nine years of battery life, or a battery life of a different amount.

The device can run off battery power, and/or solar power alone. In this instance, all power income is from the solar panel and/or battery. This means that the device should behave efficiently as to not run out of power. The device can tell how much power is coming in and can operate in a series of "modes" which have a known power budget to prevent dying from lack of power, or from requiring anything but minimal battery usage. The device can determine how much power was gathered in the last cycle, and the power used by unexpected events in the last cycle. The unexpected events power is subtracted from the power gathered in the last cycle to give the power available for the current cycle. In short, the device uses the net power from the last cycle to produce an energy budget that will be used to power the current cycle. During initialization, cycles may be of different lengths. In such a case, the power amounts are normalized for current cycle length. Based on its energy budget, a device may modify its actions. For example, a device may increase the time periods that certain sensors are measured if the available power budget is too low. Other low power modifications may be that the device may send reports less often, send different reports, etc.

II. Device Embodiment

With reference to FIG. 1, a system is shown that may be used, in whole, or in part, in any of the embodiments disclosed herein. A device 100 is disclosed, which may be part of a building control system that determines the comfort level of a building, may be part of a garden-farming operation that controls watering and other agricultural functions, may control values for scientific experiments, or may have a different use. This device may comprise a solar panel 105, and a battery 110. This battery may have sufficient power to last for a year, sufficient power to last for five years, for ten years, for some number of months, etc. There may be a processor 115 on board which may be able to make certain decisions, such as where to send data, may make calculations, and so on. The processor may be a microprocessor, a microcontroller unit, etc. The processor may comprise high-efficiency signal processing, low power, low cost, and/or may have other features. The processor may comprise memory 120, and/or programmable input/output peripherals. Memory 120 may be present separate from the processor.

The device may have one or more sensors 125 associated with it. The device may be able to take internal readings and sensor readings, and may be able to take timestamps when certain actions happen. The sensors associated with the device may include an air temperature sensor, a radiant temperature sensor, an atmospheric pressure sensor, a sound pressure sensor, an occupancy mapping sensor, an occupancy detection sensor, an occupancy velocity sensor, an indoor air quality sensor, which may be a volatile organic compound sensor, a $CO_2$ concentration sensor, a light intensity sensor, etc. These sensors may be grouped into low power sensors and high power sensors; i.e., sensors that require a higher amount of power to collect the specific sensor data, take a sensor reading, et. Device data 130 may also be included. The device data, in an illustrative embodiment, is data that the device senses using its sensors and then stores. Not all sensed data may be stored, some may be sent immediately to a different device. The device data may also include information about the device such as timestamps that memorialize when certain events happen, energy readings such as battery energy readings, solar panel energy readings, energy accumulation amounts, energy amounts that are unexpected, etc. These data may also be stored for particular times. The device data may be stored in memory 120. A communication medium 135 may also be included. This communication medium 135 may be wired, wireless, 1-wire, a combination of the above, or a separate type entirely. The communication medium may be a bluetooth transmitter. A device may have multiple transmitters. The device may use the processor with memory to use the communication medium to receive a message from a neighboring node, and/or pass a message to a neighboring node. The device may be able to take internal readings and sensor readings, and may be able to take timestamps when certain actions happen. A neighboring node may be a device that is one jump (or hop) away in a mesh network. In some embodiments, a neighboring node may be two jumps away, or more.

Figure 2:
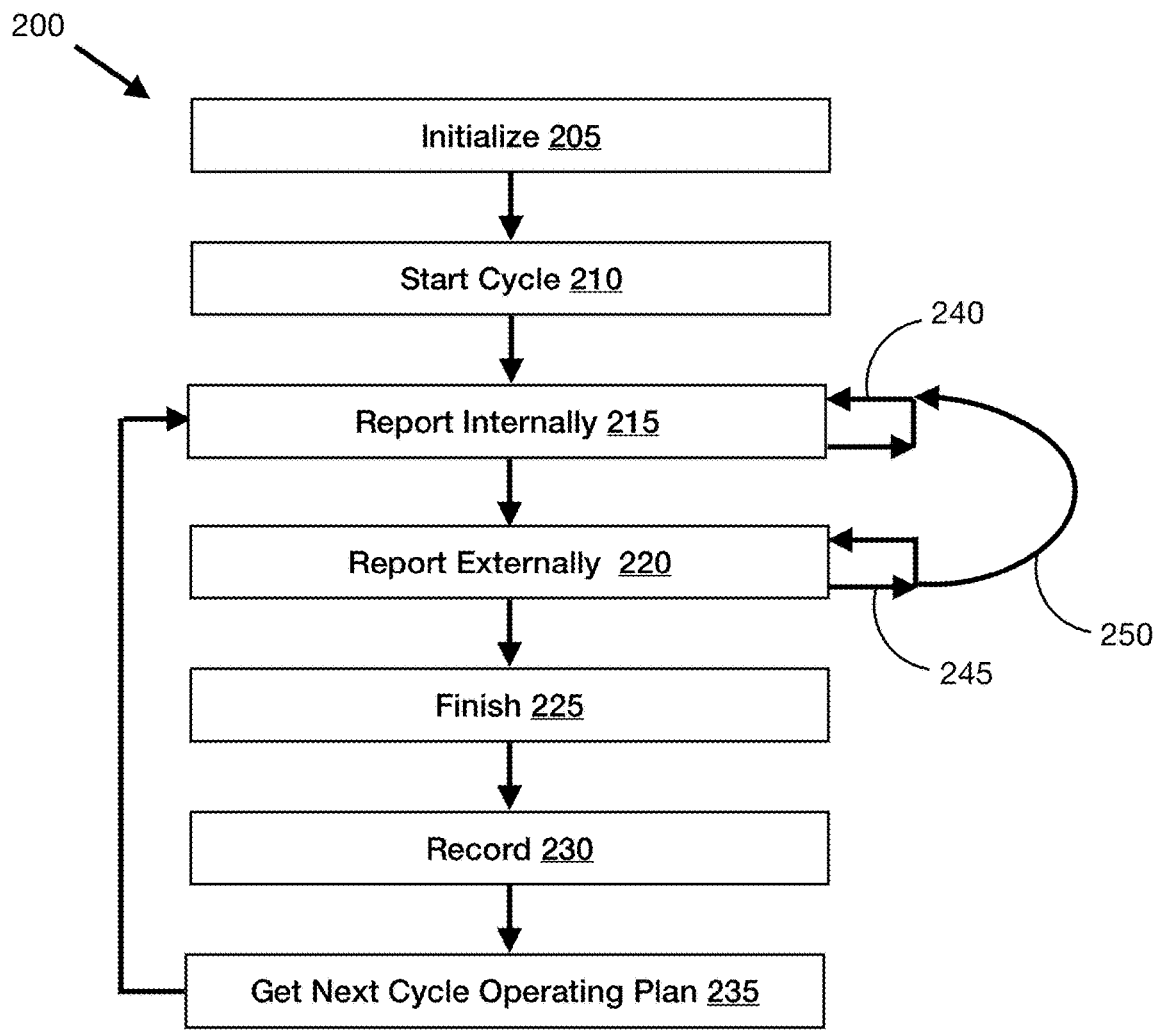
FIG. 2 is a flowchart that illustrates a method for running a sensor in conjunction with which some described embodiments can be implemented.

With reference to FIG. 2, a flow chart 200 describes a method that may be used by the device in embodiments disclosed herein. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a microprocessing unit, a digital circuit designed to process information, and/or mechanisms for electronically processing information), such as in the processor 115. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 205, the device may initialize. If the device has not been initialized yet, or has not been through a cycle, needs initialization for another reason, etc., the sensor may take a light reading, and then determine that this light reading will remain steady for its entire first cycle length, giving the sensor a first energy budget. This may be determined by having the sensor reading extended for a current cycle length.

In some embodiments, the device may have a value stored in memory that is the default first cycle energy budget. The sensor may also determine how much power it currently has. This current power may also be used to determine the first energy budget. At operation 210, a cycle may be started. This may involve providing a timestamp to mark when this cycle begins. At operation 215, a report may be sent internally. The report may report power events to a budget manager. This internal report may be stored to memory 120, may be sent to a budget manager (which may also be in memory 120), etc. The report may be taken multiple times per cycle 240. The internal report may include income event(s) for the cycle, report ad-hoc expense event(s) for a cycle, and/or report ad-hod expense rate and duration for the cycle. Income events are those that have a single power value that the event takes. Ad-hoc events power use is dependent on the time the event took. Therefore, to correctly characterize these events, duration may be multiplied by an event expense rate, or another method may be used. These internal budget values may be used to determine an energy neutral schedule for the device. The schedule may not be able to be energy neutral, in which case, the schedule may be created to be close to energy neutral. The internal report events, such as sensor readings, may be gathered just before the report is sent. In some embodiments, there may be multiple reading 240 taken per cycle. This internal reporting data is also discussed with reference to FIG. 5.

At operation 220 a report may be sent to an external device. This report may comprise gathered sensor and power state measurements. The report may be sent by the communication medium to a close-by device, such as a neighboring sensor, a further away device, such as a transmitting and receiving device a few hops away, a controller, a satellite controller, etc. In some embodiments, there may be multiple readings taken per cycle 245. In some embodiments, an external report 220 may trigger 250 an internal report 215. This allows an external report rate to occur at a different rate than an internal report, or they may be tied together. At operation 225, a finish event occurs. This finish event may comprise taking a timestamp and/or other finish actions. At operation 230, a record event may occur. Some data that may be recorded is discussed with reference to FIG. 6. At operation 230, the next cycle operation plan may be fetched.

Figure 3:
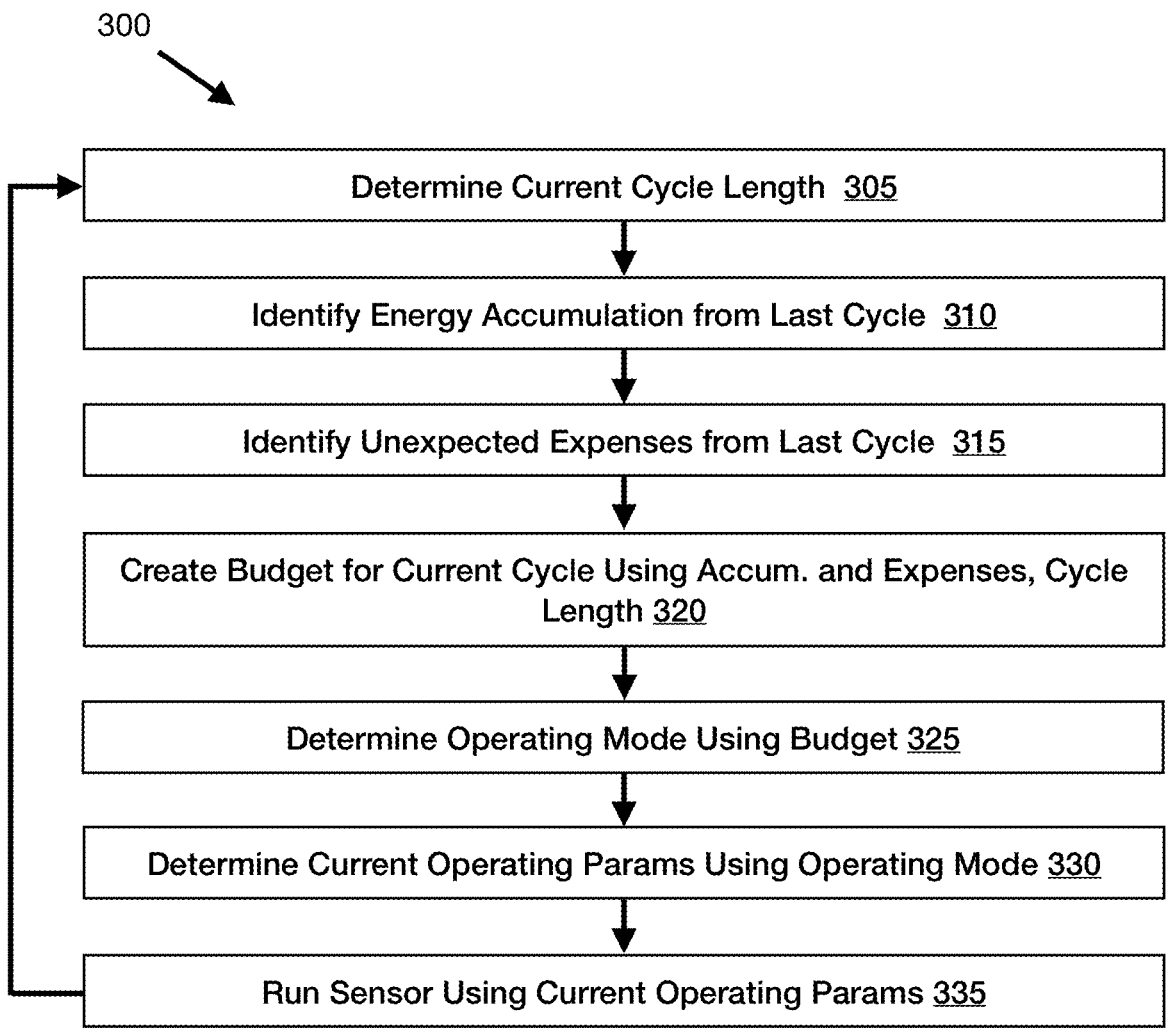
FIG. 3 is a flowchart that illustrates a method for determining a cycle operating plan in conjunction with which some described embodiments can be implemented.

With reference to FIG. 3, a flow chart 300 discloses a method that can be used to determine a next cycle operating plan. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a microprocessing unit, a digital circuit designed to process information, and/or mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 305, a current cycle length may be determined. Determining cycle length is discussed with reference to FIG. 4. At operation 310, energy accumulation from a last cycle is identified using sensor data. In some implementations, when data is recorded 225, the last power cycle accumulation may be recorded. In such a case, the data can be looked up. In some implementations, the current and power of the solar panel are measured periodically during the last cycle, and are then, during operation 310, converted to an energy accumulation. An operating mode, discussed with reference to FIG. 7, may determine a cycle period for solar power energy to be measured. This may comprise charting the raw power energy accumulations, and then filling in the gaps using the trapezoidal rule. The income estimate is then integrated to convert to energy. Other methods may be used as well. At operation 315, unexpected power expenses from the last cycle are identified. As an example of an unexpected power expense, a user may initiate a wireless connection which will draw power unexpectedly. A wireless connection may be a bluetooth connection which uses a non-directable non-connected advertisement for the message. A Bluetooth mesh proxy may adapt a connection for a device (such as a phone) (bluetooth mesh uses a non-directable non-connected advertisements for every message) Bluetooth low energy have to make a connection where you talk back and forth. Phone not listen all the time. Bluetooth mesh Proxy is adopting the connection for a phone, will translate the the messages—bridge between the advertising based medium to a connection based medium. There are proxy devices we can use) which will draw power unexpectedly. The device may record the unexpected expenses during a recording event 225 during the device's last cycle. At operation 320, a budget may be created for the current cycle. The budget creating may be under control of a budget manager. The budget creation may comprise using the energy accumulation from a last cycle (which may be the previous cycle) and the unexpected operation energy consumption from the last cycle. When there is not a last cycle, such as during initialization, the energy budget may be created by making a single energy reading, expanding that reading for the length of the cycle, and using that as the energy budget. The energy accumulation may be from a solar power energy accumulation device, several solar power energy accumulation devices, a different sort of energy accumulation device, such as wind power, etc. In some embodiments, unexpected expenses from the last cycle are subtracted from the accumulated energy from the last cycle to give an energy budget. Sometimes, as when in a start-up period, the last cycle and the current cycle for which energy is budgeted may be of different lengths. When this is the case, as the energy budget is determined for a different time, the current budget may be normalized for the current length of time. For example, if the last cycle is half the length of the current cycle, then the budget for the current cycle would be 2*(energy accumulation for the last cycle-unexpected expenses from the last cycle).

At operation 325, an operating mode is determined using the energy budget. The operating mode determines, e.g., one or more of reboot interval, sensor measurement interval, report interval, wireless connection interval, configuring the radio reception interval, polling the solar raw power income interval, radio reception buffer, relay count; e.g., the number of messages that a node will pass from a neighboring node to another node, etc. In some implementations, the operating mode is determined by choosing the mode whose energy requirement is less than the next highest mode, but more than the next lowest mode. Operating modes may be created such that the sleep energy, various intervals and other scheduled energy-using actions are such that the total energy used during a cycle will be less than or equal to the operating budget. At operation 330, current operating parameters are determined using the chosen operating mode. In some embodiments, determining the operation parameters and determining the operating mode may be combined. At operation 335, the sensor is run for the current cycle using the current operating parameters. The modes may have values for the intervals, buffers, counts, etc., which are then used when the sensor runs for the current cycle. Modes may determine the number of times the communication medium may receive a message from a neighboring node, and/or pass a message to a neighboring node.

Figure 4:
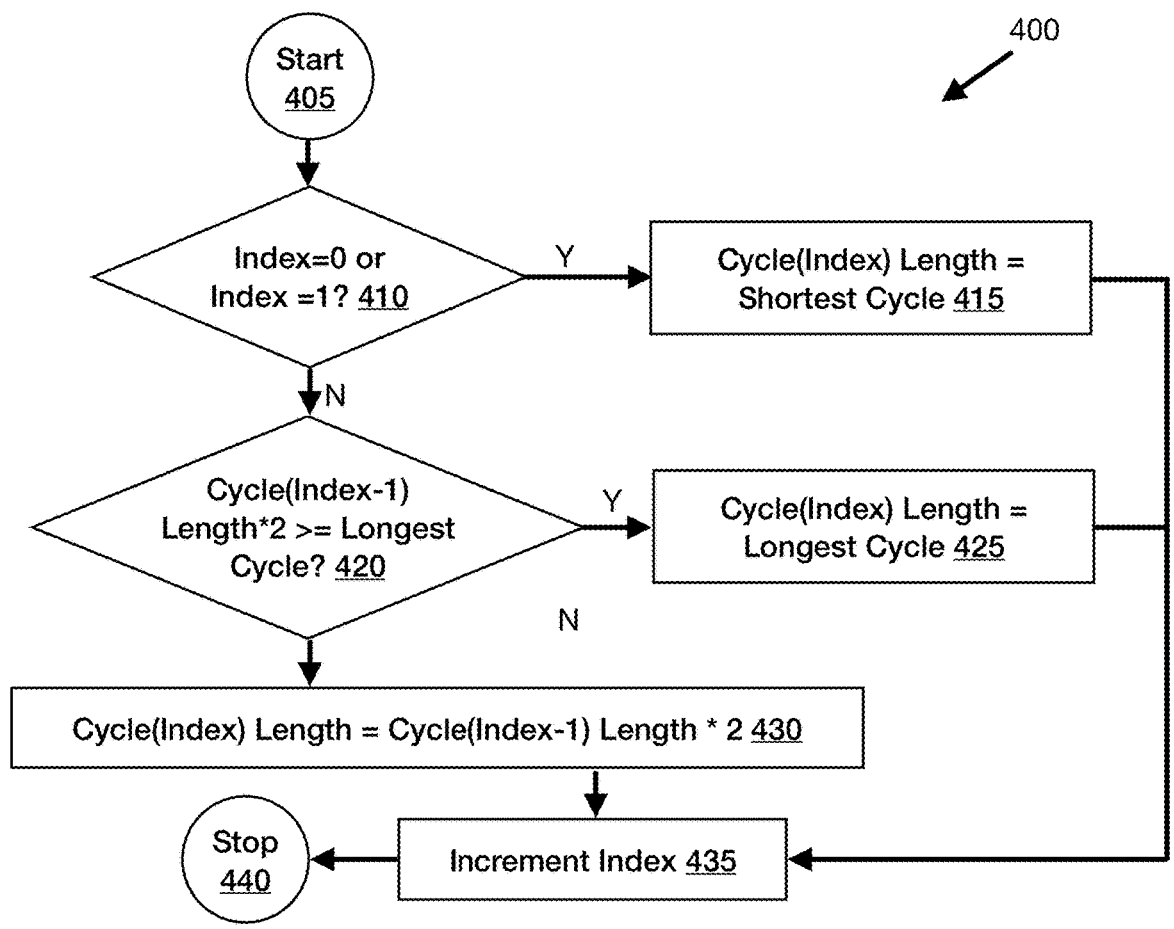
FIG. 4 is a flowchart that illustrates a method for determining a cycle length in conjunction with which some described embodiments can be implemented.

FIG. 4 is a flowchart 400 disclosing an exemplary method to choose a current cycle length. A shortest cycle and a longest cycle are determined at some point, for example, during initialization. At operation 405, a cycle length determination begins with a current index and a current cycle length. Initially, for example, during a setup phase, the index is sent to 0, a shortest cycle may be set to 45 minutes, and a longest cycle may be set to 24 hours. At determination point 410, it is determined if the index equals 0 or 1. If so, then at operation 415 the the cycle length is set to the initial cycle length. At decision point 420, if the previous cycle length*2 is equal or greater than the longest cycle length, then the cycle length is set to the longest cycle length. Else, at operation 430, the cycle is set to the cycle length*(index-1)*2. Thus, if the initial cycle length is set to 45 minutes, the third cycle length will be 45*(3-2)*2=90 minutes, the fourth cycle will be 180 minutes, and so forth. At operation 435, the index is incremented; and at operation 440 the program portion stops until a next cycle length is needed. This is but one method of determining cycle lengths. Another cycle length method may double the cycle length every cycle until a longest cycle length is set, another cycle length method may add a set number to each successive cycle, a cycle length may be set as a single value, and so on.

Figure 5:
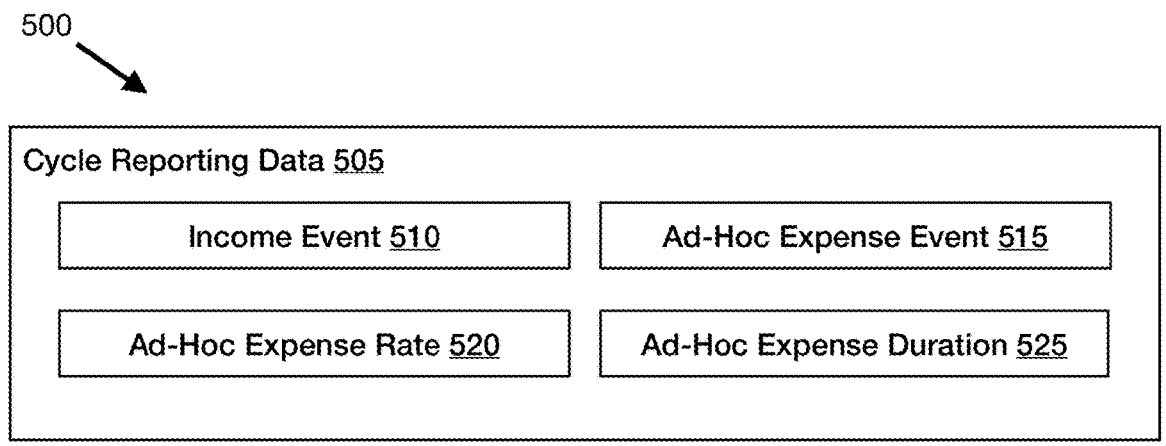
FIG. 5 is a functional block diagram showing some cycle reporting data in conjunction with which some described embodiments can be implemented.

FIG. 5 is a block diagram 500 which discloses cycle reporting data 505—data which may be reported to a budget manager, etc. Reporting is described with reference to FIG. 2 at 215. An income event 510 may be reported. This report may be to a budget manager that keeps track of how much energy is scheduled to be used, how much scheduled energy is used, how much unexpected energy expenses are used, etc. An income event is an event that requires a set amount of energy. Examples of income events 510, in some systems, include sensor measurements, wireless connection advertising messages, sensor set messages, etc. An ad-hoc expense 515 takes a variable amount of time, and so the expense rate 520 and duration 525 may also be recorded. In some embodiments, the ad-hoc expense rate 520 and ad-hoc expense duration 525 may be stored as a single event amount.

Figure 6:
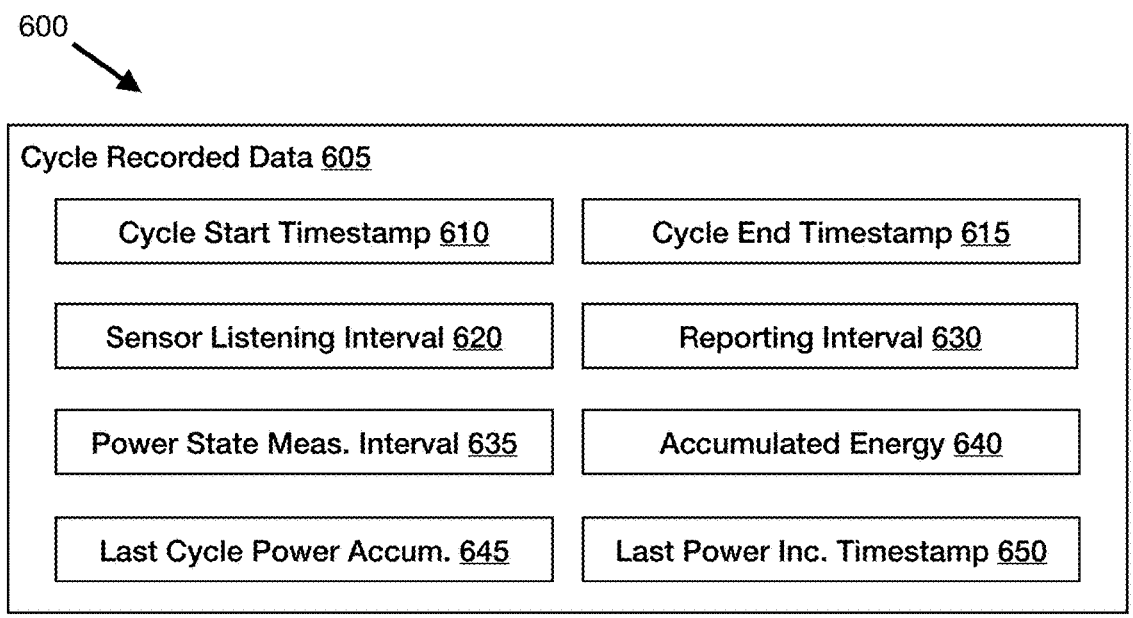
FIG. 6 is a functional block diagram showing some cycle recorded data in conjunction with which some described embodiments can be implemented.

FIG. 6 is a block diagram 600 which discloses data which may be recorded by a device. These data may include intervals: a sensor listening interval 620, a reporting interval 630, and a power state measuring interval 635. These intervals may change based on the amount of the cycle budget, with longer intervals for smaller energy budgets. The data 605 may further comprise the timestamp of the cycle start 610, the timestamp of the cycle end 615, the interval between the current report and the previous report 630, and/or a sensor listening interval 620, which may define the interval between which sensor readings are taken. When there are multiple sensors associated with a device, there may be multiple sensor listening intervals 620. In some embodiments, each sensor associated with a device may have its own sensor listening interval 620. In some embodiments, low power sensors (such as temperature, humidity, pressure) may share a low power sensor listening interval. In some embodiments, high power sensors may share a high power sensor listening interval. In some embodiments, there may be an interval for power state measurements 635, such as the interval that a solar panel is measured. There may be different intervals for different power states, such that there is a separate interval for reporting solar power and a separate interval for reporting battery power. A reporting interval 630 may also be included. This reporting interval may be how often the device reports its sensor data and other information to a different device. The different device may be a central computer, a satellite computer, a sensor, etc. Accumulated energy 640, the last cycle power income measured (accumulation) 645, and the last power income timestamp 650, etc., may also be recorded.

Figure 7:
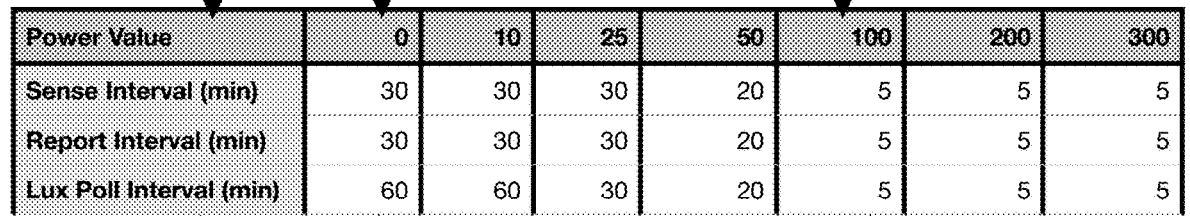
FIG. 7 is a matrix describing exemplary operating modes in conjunction with which some described embodiments can be implemented.

FIG. 7 is an exemplary simple operating mode chart 700. In this instantiation of an operating mode, the operating mode is based on power value 705. The power value may be the operating budget. When cycles are of different length, the power value may be a normalized operating budget. When the power value is 0 715, then intervals (which may comprise sensor listening intervals, reporting intervals, transmission configuration interval, and power accumulation (e.g., in LUX, or another unit) polling intervals) are set to higher values. This leads to fewer polling events with less energy expended. For example, the Lux posting interval 710 is set to 60 min 720, with the sensor listening interval set to 30 min. When there is a greater power value (e.g., energy budget), such as 100 725, then the intervals are shorter, such as the sensor listening interval set to 5 min, and the Lux (solar power energy) poll interval set to 5 min 730.

III. Device Embodiment

With reference to FIG. 8 at 800, a device 805 is shown that may be used, in whole, or in part, in any of the embodiments disclosed herein. This device 805 may be part of a building control system that determines the comfort level of a building, may be part of a garden-farming operation that controls watering and other agricultural functions, may control values for scientific experiments, or may have a different use. This device may comprise an energy harvesting portion 810. This energy harvesting portion 810 may comprise one or more solar cells, a wind harvesting portion, a parasite electrical harvesting portion that harvests energy when there is sufficient electricity available on an electrical power device, etc. The energy storage element 815 may be associated with the energy harvesting portion 810 such that the energy storage element 815 stores energy that the energy harvesting portion gathers. An energy storage element 815 may be a battery. This battery may have sufficient power to last for a year, sufficient power to last for five years, for ten years, for some number of months, etc. A processor and memory element 830 may comprise a processor and memory. The processor may be a microprocessor, a microcontroller unit, etc. The processor may comprise high-efficiency signal processing, low power, low cost, and/or programmable input/output peripherals.

Other features may also be included. The memory may be volatile memory such as Random Access Memory (RAM) or non-volatile Read Only Memory (ROM). The RAM maybe Static RAM, Dynamic Ram, or a different type. The ROM may be masked ROM, PROM (Programmable Read Only Memory), EPROM (Erasable Programmable Read Only Memory), EEPROM (Electrically Erasable Programmable Read Only Memory), etc. The processor and memory element 830 may comprise a computer program 835 that may be able to make certain decisions, such as where to send data, may make calculations, and so on. Catalogued expenses 840 may also be stored within the memory. These catalogued expenses may be the amount of energy needed for various actions, such as provisioning, reporting various behaviors, collecting sensing data; sensing—a device may have more than one sensing device, each separate sensor may have separate energy usage requirements, transmitting information, changing device settings, waking up, etc.

The device may have one or more sensor portions 825 associated with it. These sensor portions may include an air temperature sensor, a radiant temperature sensor, an atmospheric pressure sensor, a sound pressure sensor, an indoor air quality sensor, which may be a volatile organic compound sensor, a $CO_2$ concentration sensor, a light intensity sensor, an occupancy detection sensor, an occupancy mapping sensor, an occupancy velocity sensor, etc. A transmitter portion 820 may also be included, which may be wired, wireless, 1-wire, a combination of the above, or a separate type entirely. The transmitter may be a bluetooth transmitter. A transmitter portion may comprise multiple transmitters. The transmitter may be configured to send and receive information from and to an entity, where the entity may be a sensor, a controller, a satellite controller, a master computer, etc.

With reference to FIG. 9, a flow chart 900 describes a method that may be used by the device in embodiments disclosed herein. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

In some embodiment, method 900 may be implemented by a program 905 stored in a processor and memory element, in one or more processing devices (e.g., a digital processor, an analog processor, a microprocessing unit, a digital circuit designed to process information, and/or mechanisms for electronically processing information), such as in the processor and memory element 830. The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At operation 910, a cycle length is determined. This is described with greater detail with reference to FIG. 4. At operation 915, the power gathered last time, which may be by an energy harvesting portion, is determined. In some embodiments, the amount of power gathered is measured at a point in time at set intervals. The power gathered is then measured by extrapolating between the interval points. This extrapolation may comprise using the trapezoidal rule to determine the area underneath the created trapezoids, integration, or some other method. In some embodiments, the amount of power used previously over several cycles is averaged. In some embodiments, the median of the amount of power used previously over several cycles is calculated. In some embodiments, the average of the amount of power used previously over several cycles is calculated. In some embodiments, the number of cycles used is variable, depending e.g., on how long the sensor has been running, if there are any values that are over or under a threshold amount, etc. At operation 920, the unexpected power consumption is determined for the last cycle. This unexpected power consumption comprises events that use power but are not part of the device's schedule. This may comprise a user requesting something from a sensor, such as an unexpected report, a reset, and so on. In some embodiments, the median is taken of the unexpected power usage over several cycles. In some embodiments, the average is taken of the unexpected power usage over several cycles. In some embodiments, the number of cycles used is variable, depending e.g., on how long the device has been running, if there are any values that are over or under a threshold amount, etc. At operation 925, in some embodiments, the amount of battery power available is determined. In some embodiments, the average is taken of the battery power availability over several cycles. In some embodiments, the number of cycles used is variable, depending e.g., on how long the sensor has been running, if there are any values that are over or under a threshold amount, etc.

At operation 930, in some embodiments, the energy budget for the current cycle is determined. In some embodiments the amount of power gathered previously minus the unexpected power used previously is the energy budget. In some embodiments, the amount of battery power available is used in the calculation. At operation 935, the cycle length is normalized. If the current cycle length is of a different length than the last cycle length or previous cycle lengths, then the amount of energy allotted to the current cycle should be normalized. At operation 940, the energy budget is used to determine the operating mode. More information on the operating budget can be found with reference to FIG. 7. At operation 945, the operating mode is used to determine sensor sampling rates. In some embodiments, the sensor portion may be divided into a a high power sensor portion and a low power sensing portion. The a high power sensor portion and the low power sensor portion may have separate sensor sampling rates. The operating mode may then comprise a different sampling rate for each. In some embodiments, the sensors are grouped into other groups with a different sampling rate for each sensor grouping.

IV. Method Embodiment

Figure 10:
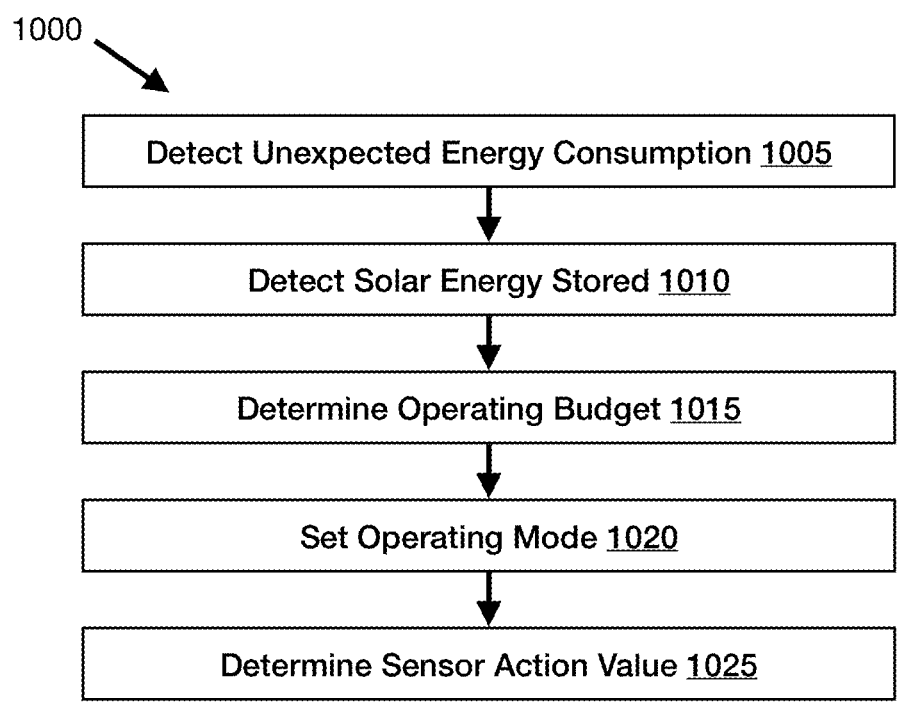
FIG. 10 is a flowchart that describes methods that can be used by an energy use determination device in conjunction with which some described embodiments can be implemented.

With reference to FIG. 10, a flow chart 1000 describes a method that may be used by the device in embodiments disclosed herein. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 9 and described below is not intended to be limiting.

In some embodiment, method 1000 may be implemented in one or more processing devices (e.g., a digital processor, an analog processor, a microprocessing unit, a digital circuit designed to process information, and/or mechanisms for electronically processing information), such as in the processor 115 and memory 120. The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At operation 1005, unexpected energy consumption is detected that is used by a device during a first time. Unexpected energy consumption may be energy used by actions that were not planned by the device. These may include requests from a user, unexpected reboots, etc. The first time may be the cycle just before the current one, an average of some number of previous cycles, a median of some number of previous cycles, selected cycles, cycles whose unexpected energy consumption are above or below a threshold value may be ignored, or another way may be chosen to determine a first time. At 1010, an amount of solar energy stored by the device during the first time is determined. This first time may be the cycle just before the current one, an average of some number of previous cycles, a median of some number of previous cycles, selected cycles, etc. In some embodiments, cycles whose unexpected energy consumption are above or below a threshold value may be ignored. Another way may be chosen to determine a first time. At operation 1015, an operating budget is determined using the amount of solar energy stored by the device and the unexpected power consumption. In some embodiments, the unexpected energy consumption from the first time is subtracted from the solar energy stored during the first time. The operating budget may be for a set time, such as a cycle length. This cycle length may be different than the first cycle length used to determine the operating budget. In such instances, the budget amount may be normalized for the difference in times. For example, if the operating budget cycle length is 45 minutes, (the first time)

but the current cycle length (the second time) is 90 minutes, double the first time, then the operating budget for the second time will be doubled. At operation 1020, an operating mode is set using the operating budget. In some embodiments, setting the operating mode comprises setting a schedule for the device. The schedule may be an interval or series of intervals that sensors are sampled, an interval or series of intervals that the device reports, an interval or series of intervals that energy source output is sampled, such as solar power, etc. At operation 1025, the device is run using the operating mode. At operation 1025, running the device may comprise determining one or more sensor action values. Sensor action values may comprise a device reboot interval, a sensing interval, a report interval, a wireless connection interval, a config RX interval, a solar power energy polling interval, a solar power relay count, or a different interval or count. The solar power relay count determines the number of messages that the device is able to ferry from one device to another during the current cycle.

In view of the many possible embodiments to which the principles of the technology may be applied, it should be recognized that the illustrated embodiments are examples and should not be taken as a limitation on the scope of the invention. For instance, various components of systems and tools described herein may be combined in function and use. We, therefore, claim as our invention all subject matter that comes within the scope and spirit of these claims.

I claim:

1. A device comprising:
   a battery;
   a means for charging the battery; and
   a processor at least partially powered by the battery and configured to:
   determine a previous energy accumulation via the means for charging the battery during a previous cycle,
   determine at least one operating parameter for an energy-consuming activity during a next cycle based on the previous energy accumulation;
   perform the energy-consuming activity according to the at least one operating parameter during the next cycle;
   identify an unexpected energy expenditure amount during the previous cycle; and
   compute an energy budget for the next cycle by normalizing the previous energy accumulation and the unexpected energy expenditure amount to the next cycle; and
   wherein the next cycle is associated with a next cycle duration that is different from a previous cycle duration associated with the previous cycle.

2. The device of claim 1, wherein:
   in determining the at least one operating parameter, the processor is configured to determine the at least one operating parameter based on both the previous energy accumulation and the unexpected energy expenditure amount.

3. The device of claim 2, wherein:
   in determining the at least one operating parameter based on both the previous energy accumulation and the unexpected energy expenditure amount, the processor is configured to select the at least one operating parameter from a set of operating parameters, wherein the at least one operating parameter is associated with an estimated energy requirement that is less than the energy budget.

4. The device of claim 1, wherein the at least one operating parameter comprises an interval at which the energy-consuming activity will be repeated during the next cycle.

5. The device of claim 1, wherein the energy-consuming activity includes at least one of rebooting, obtaining a sensor measurement, transmitting a report, connecting to a wireless network, and receiving data.

6. The device of claim 1, wherein:
   the energy-consuming activity comprises relaying messages received from at least one neighboring device, and
   the at least one operating parameter comprises a number of maximum number of messages to be relayed during the next cycle.

7. The device of claim 1, wherein the means for charging the battery comprises a solar panel.

8. A method for operating a device powered by a battery comprising:
   determining a previous energy accumulation via a means for charging the battery during a previous cycle;
   determining at least one operating parameter for an energy-consuming activity during a next cycle based on the previous energy accumulation; performing the energy-consuming activity according to the at least one operating parameter during the next cycle;
   identifying an unexpected energy expenditure amount during the previous cycle;
   associating the next cycle with a next cycle duration that is different from a previous cycle duration associated with the previous cycle; and
   computing an energy budget for the next cycle using the previous energy accumulation and the unexpected energy expenditure amount by normalizing the previous energy accumulation and the unexpected energy expenditure amount to the next cycle.

9. The method of claim 8, further comprising:
   determining the at least one operating parameter comprises determining the at least one operating parameter based on both the previous energy accumulation and the unexpected energy expenditure amount.

10. The method of claim 9, further comprising:
    computing an energy budget for the next cycle using the previous energy accumulation and the unexpected energy expenditure amount,
    wherein determining the at least one operating parameter based on both the previous energy accumulation and the unexpected energy expenditure amount comprises selecting the at least one operating parameter from a set of operating parameters, wherein the at least one operating parameter is associated with an estimated energy requirement that is less than the energy budget.

11. The method of claim 8, wherein the operating parameter comprises an interval at which the energy-consuming activity will be repeated during the next cycle.

12. The method of claim 8, wherein the energy-consuming activity includes at least one of rebooting, obtaining a sensor measurement, transmitting a report, connecting to a wireless network, and receiving data.

13. The method of claim 8, wherein:
    the energy-consuming activity comprises relaying messages received from at least one neighboring device, and
    the operating parameter comprises a number of maximum number of messages to be relayed during the next cycle.

14. The method of claim 8, wherein the means for charging the battery comprises a solar panel.

15. A non-transitory machine-readable medium encoded with instructions for execution by a processor powered at least in part by a battery comprising:
    instructions for determining a previous energy accumulation via a means for charging the battery during a previous cycle;
    instructions for determining at least one operating parameter for an energy-consuming activity during a next cycle based on the previous energy accumulation;
    instructions for performing the energy-consuming activity according to the at least one operating parameter during the next cycle;
    instructions for identifying an unexpected energy expenditure amount during the previous cycle;
    instruction for computing an energy budget for the next cycle by normalizing the previous energy accumulation and the unexpected energy expenditure amount to the next cycle; and
    wherein the next cycle is associated with a next cycle duration that is different from a previous cycle duration associated with the previous cycle.

16. The non-transitory machine-readable medium of claim 15,
    wherein the instructions for determining the at least one operating parameter comprise instructions for determining the at least one operating parameter based on both the previous energy accumulation and the unexpected energy expenditure amount.

17. The non-transitory machine-readable medium of claim 16,
    wherein the instructions for determining the at least one operating parameter based on both the previous energy accumulation and the unexpected energy expenditure amount comprise instructions for selecting the at least one operating parameter from a set of operating parameters, wherein the at least one operating parameter is associated with an estimated energy requirement that is less than the energy budget.

\* \* \* \* \*